United States Patent
Rice et al.

[11] Patent Number: 5,975,423
[45] Date of Patent: Nov. 2, 1999

[54] PORTABLE FULLY SELF-CONTAINED PRESSURE WASH-DOWN SYSTEM AND METHOD

[76] Inventors: Terrence D. Rice, R.R. 1 Box H-944, Jasper, Ga. 30143; Keith Ballard, 1313 Bass Dr., Woodstock, Ga. 30189

[21] Appl. No.: 09/199,021

[22] Filed: Nov. 24, 1998

Related U.S. Application Data

[62] Division of application No. 08/820,765, Mar. 19, 1997
[60] Provisional application No. 60/013,685, Mar. 29, 1996.

[51] Int. Cl.⁶ ................ B05B 17/00; B05B 15/06; B63B 59/00
[52] U.S. Cl. ................ 239/1; 239/154; 239/273; 239/302; 239/332; 239/360; 239/724; 114/222; 222/333
[58] Field of Search ............... 239/1, 154, 273, 239/302, 332, 360, 724; 114/222; 222/333

[56] References Cited

U.S. PATENT DOCUMENTS

| | | | |
|---|---|---|---|
| 3,016,841 | 1/1962 | Albertson et al. | 222/333 X |
| 3,904,116 | 9/1975 | Jones et al. | 239/332 X |
| 5,100,058 | 3/1992 | Wei | 239/332 X |
| 5,248,089 | 9/1993 | Bekius | 239/332 X |
| 5,330,104 | 7/1994 | Marcus | 239/273 X |

FOREIGN PATENT DOCUMENTS

| | | | |
|---|---|---|---|
| 3839158 | 5/1990 | Germany | 239/360 |

*Primary Examiner*—Andres Kashnikow
*Assistant Examiner*—Robin O. Evans
*Attorney, Agent, or Firm*—Thomas, Kayden, Horstemeyer & Risley, L.L.P.

[57] ABSTRACT

A portable, fully self-contained pressure wash-down system operates in a storage mode for storing and hermetically sealing system components when the system is not in use, and works in an operation mode for allowing portable operation of the system. The system includes a container adapted to house the system and a lid connected to the container by a hinge. The lid sealingly engages a top portion of the container to store and protect system components when the system is in a storage mode. The system includes a pump disposed in the container. The pump includes a low pressure inlet for delivering low pressure water to the pump and a high pressure outlet for delivering pressurized water from the pump. The system also includes an intake line having first and second ends, wherein the first end of the intake line receives water from a water source and the second end is connected to the pump inlet. The first end of the intake may contain a filter for excluding harmful debris from the pump or other system components. The system may also include a filter between the intake line second end and pump or within the pump itself. The intake line is preferably adapted to be stored within the container when the system is in a storage mode.

10 Claims, 4 Drawing Sheets

5,975,423

PORTABLE FULLY SELF-CONTAINED PRESSURE WASH-DOWN SYSTEM AND METHOD

RELATED APPLICATIONS

This application is a divisional application of Ser. No. 08/820,765, filed Mar. 19, 1997, entitled "Portable Fully Self-Contained Pressure Wash-Down System and Method. Also, applicant claims priority to provision application Ser. No. 60/013,685, filed on Mar. 29, 1996, and hereby incorporates by reference said provisional application in its entirety.

FIELD OF THE INVENTION

The present invention relates to an improved pressure washing device. More specifically, the present invention relates to a portable, fully self-contained pressure wash-down system and method that can be operated with a portable battery for washing an object. The wash-down system is particularly suited to power-wash a boat or motor vehicle, but many other applications are possible, including for example, washing fish or deer.

SUMMARY OF THE INVENTION

A portable, fully self-contained pressure wash-down system according to the present invention operates in a storage mode for storing and hermetically sealing system components when the system is not in use, and works in an operation mode for allowing portable operation of the system. More specifically, the system includes a container adapted to house the system and a lid having a first end rotatingly connected to a first end of the container by a hinge. The lid sealingly engages a top portion of the container to store and protect system components when the system is in a storage mode.

The system includes a pump disposed in the container. The pump includes a low pressure inlet for delivering low pressure water to the pump and a high pressure outlet for delivering pressurized water from the pump. The system also includes an intake line having first and second ends, wherein the first end of the intake line receives water from a water source and the second end is connected to the pump inlet. The first end of the intake may contain a filter for excluding harmful debris from the pump or other system components. The system may also include a filter between the intake line second end and pump or within the pump itself. The intake line is preferably adapted to be stored within the container when the system is in a storage mode.

The system also includes an outlet line having first and second ends, wherein the first end of the outlet line receives high pressure water from the pump and the second end delivers pressurized water to an object to be washed. The second end of the outlet line may include an adjustable spraying device attached thereto. The outlet line is also adapted to be stored within the container when the system is in a storage mode. For example, the outlet line may comprise a flat, ribbon-like polymer hose which fits compactly within the container.

The system also includes electrical connections adapted to be removably connected to a power source, wherein the electrical connections provide electrical energy to the pump when the system is in the operation mode. In accordance with the present invention, the electrical connections are adapted to be stored within the container when the system is in a storage mode. The electrical connectors may further include first and second alligator clips attached to the electrical connectors, wherein the alligator clips are adapted to releasably engage positive and negative poles of a power source located outside of the container. The power mode may be a twelve (12) volt power cell from a boat or an automobile.

An important aspect of the present invention includes the system's ability to hermetically seal all system components when the system is in a storage mode. More specifically, the container and lid close to hermetically seal and house the pump, intake line, outlet line and electrical connectors when the system is in a storage mode. The storage mode feature protects the components from harmful elements, allows all system components to be neatly and conveniently stored within the container between uses, and allows efficient storage of the wash-down system in tight storage areas such as boat stow away areas or automobile trunks.

The present invention also relates to a method of washing a vehicle comprising the steps of providing self-contained unit on the vehicle which houses a pump, a water intake line, a water delivery line and electrical connection leads for providing power to the pump, attaching the leads to a power source on the vehicle for providing electrical power to the pump, dropping inlet line into a source of water, and spraying the vehicle with high pressure water expelled through the water delivery line. The method may also include the steps of packing the leads, inlet line and water delivery line into the container and hermetically sealing the container for storage.

DETAILED DESCRIPTION OF THE INVENTION

Figure 4:
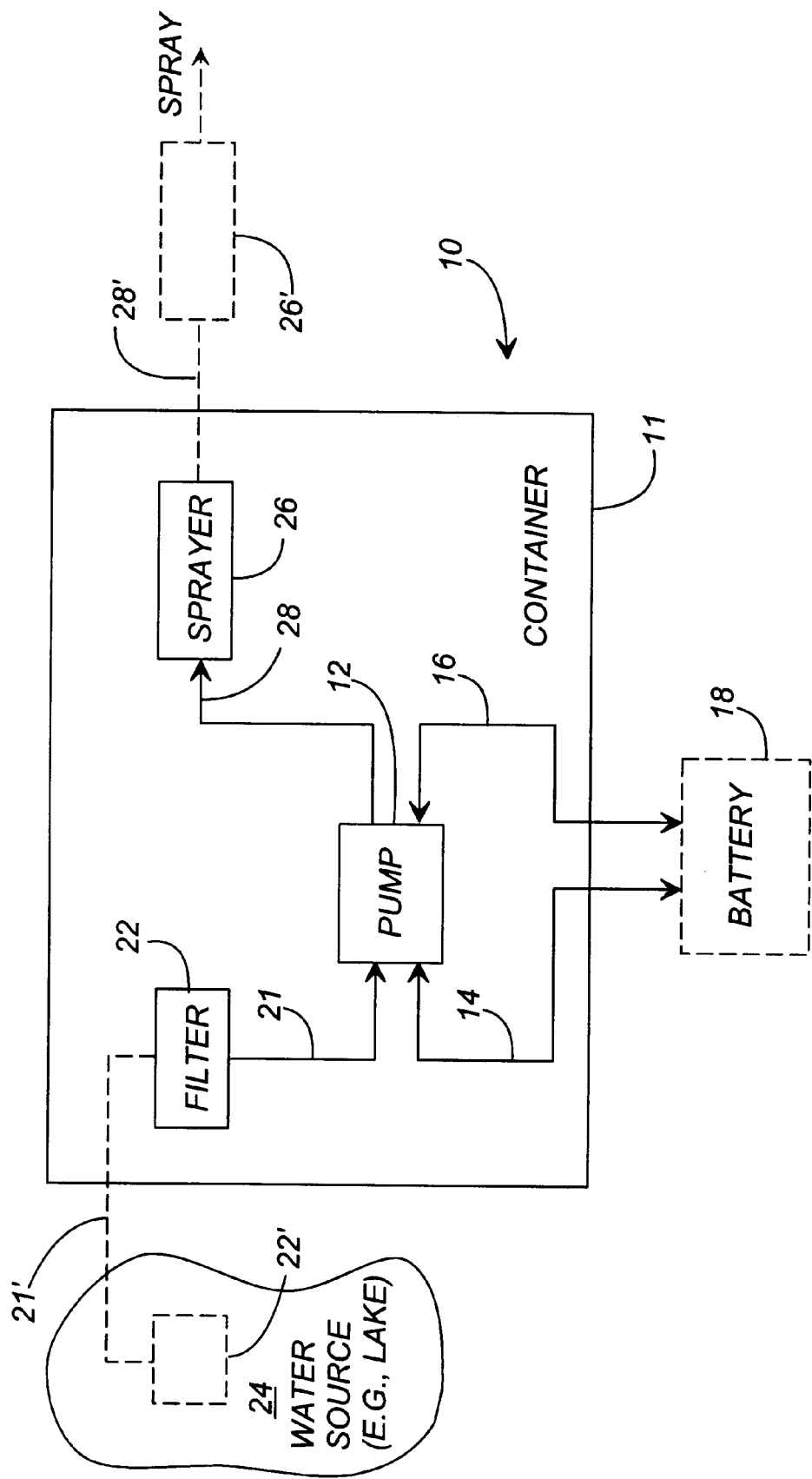
FIG. 4 is a schematic representation of the present invention, illustrating interrelationships of the system components.

In structure, the wash-down system is constructed as shown by the schematic diagram in FIG. 4. The wash-down system is generally denoted by reference numeral 10. The wash-down system 10 includes a container 11, preferably a heavy duty, waterproof plastic or metal carrying case, which contains the operational components of the system 10. A pump 12 is securely mounted in the container 11. The pump 12 is preferably a twelve (12) volt on demand 45 pounds per square inch (psi) pressure pump delivering fluid 3.5 gallons per minute (gpm), however the ordinarily skilled artisan will find any number of suitable pumps which may accomplish the purposes of the present invention. The pump 12 has electrical connectors 14 and 16 for powering the pump 12 with twelve (12) volt power from a battery 18, which is not part of the system 10 and not included within the container 11. The connectors 14 and 16 have any suitable clamping mechanisms for attaching to the battery 18, but preferably they utilize alligator clamps and the connectors 14 and 16 are preferably about ten (10) feet in length, although the ordinarily skilled artisan will recognize that nearly any length will be sufficient depending upon application. A intake line 21 having a filter 22 at its distal end is connected to the pump 12 to provide the pump 12 with water from a water source 24. The filter 22 is preferably a 40 mesh intake strainer/filter and the intake line 21 is preferably an 8 foot plastic reinforced line. Preferably, a stainless steel filter may used in connection with the intake line to counteract corrosive effects of supply (e.g. salt water). Furthermore, the water source 24 can be, for example, but not limited to, a lake, bucket of water, etc.

A sprayer 26 is connected to the pump 12 via an output line 28. In the preferred embodiment, the sprayer 26 is a heavy duty plastic pressure spray nozzle and the outlet line 28 is a 25 foot plastic ribbon (flat) hose line. The sprayer 26 is stored within the container 11 so that the sprayer 26 can be pulled from the container 11 as shown by phantom lines 26'.

Figure 1:
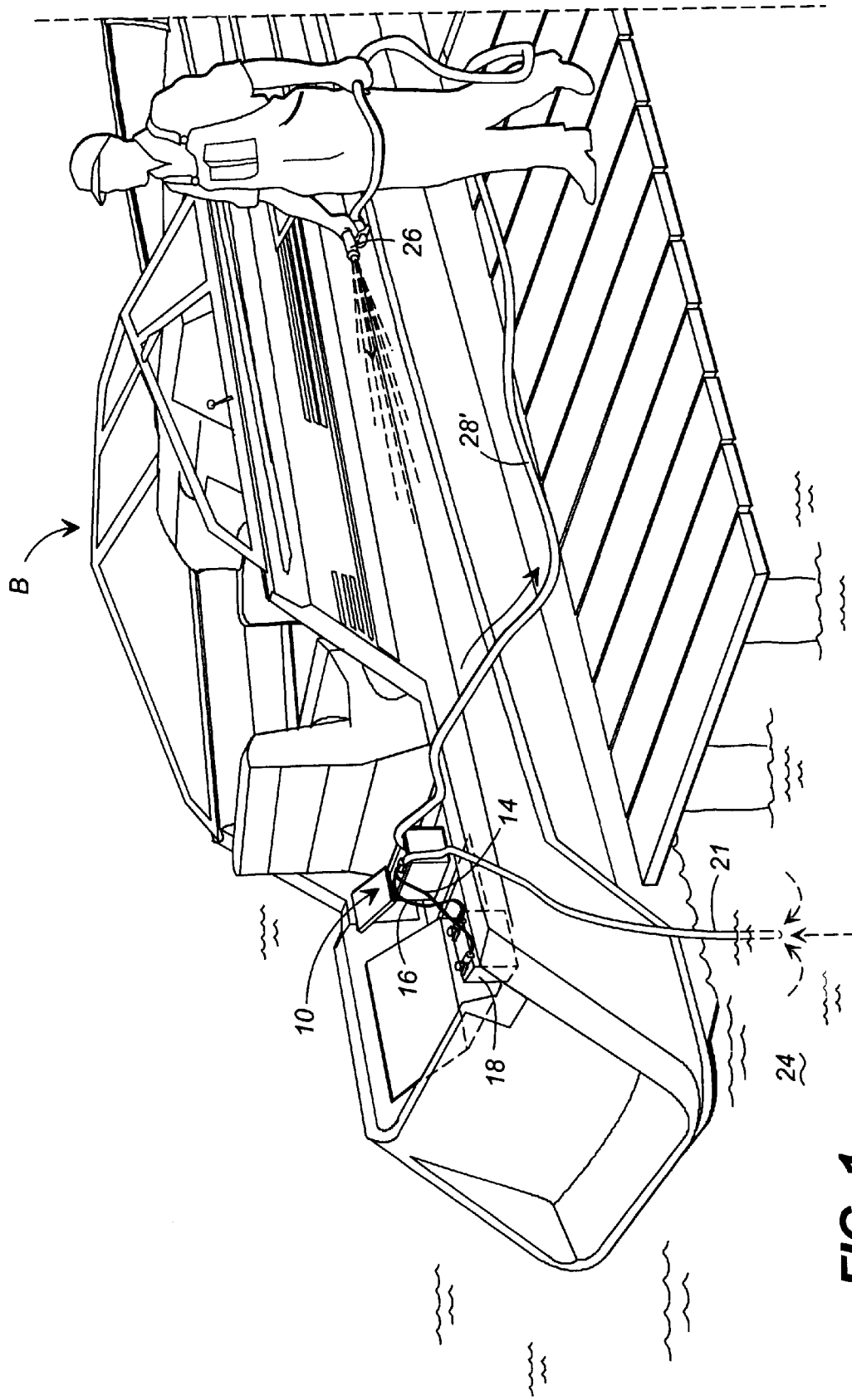
FIGS. 1 is a perspective view of the wash-down system in accordance with the present invention, shown in an operation mode within a boat.

FIG. 1 illustrates the wash-down system 10 in operation within a normal operating environment. Specifically, the system 10 sits on the deck of a boat 13, and receives water from source 24 through in-take line 21 which is hung over the bow of a boat 13. System 10 receives its power from an onboard 12 volt DC battery 18 via connections 14 and 16. As is seen from FIGS. 1–4, water delivery line or output line 28 carries pressurized water from the system 10 to the spray nozzle 26 for use by the vehicle owner.

Figure 2:
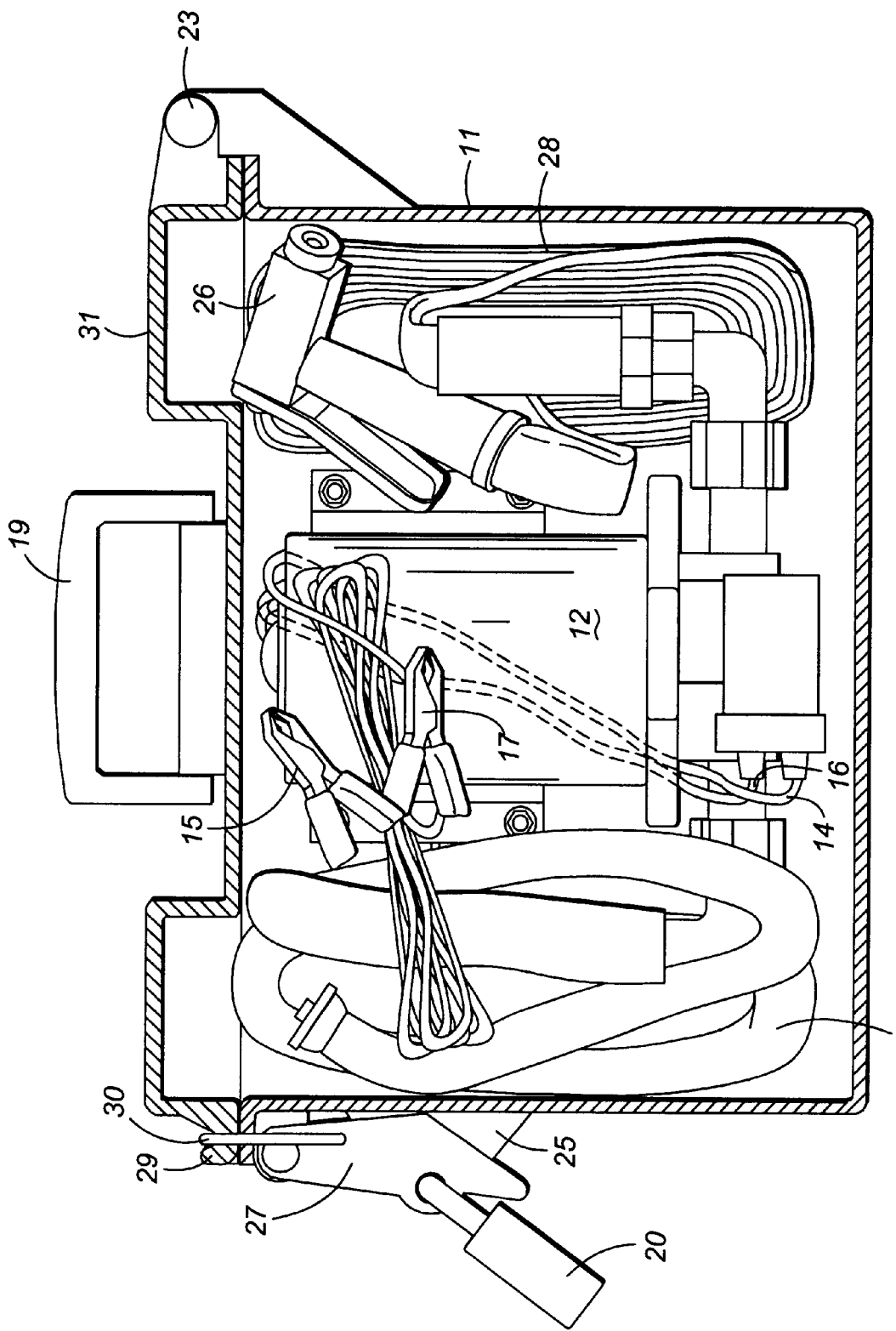
FIG. 2 is a partial sectional view of the system in a storage mode, illustrating each of the system components as they are stored within the container, beneath its lid.

FIG. 2 illustrates a partial sectional cut-away view of the wash-down system in a hermetically sealed position. Specifically, wash-down system 10 includes a pump 12 fixed in a middle portion of the container 11. Connectors 14 and 16 include alligator clips 15 and 17, respectively, for a connection to an onboard 12 volt battery, as was discussed above. As is seen from the diagram, the connections 14 and 16 may be neatly folded up to be incorporated compactly within the container 11.

Lid 31 of the subject invention includes a carrying handle 19 which allows a user to conveniently transport the system from one vehicle to another. Additionally, lid 31 includes a hinge system 23 which allows the lid 31 to be opened with respect to the container 11.

As is clearly seen from FIG. 2, the system also includes the intake line 21 which may also be conveniently stored within container 11. The intake line 21 includes a filter 22 attached to a first portion thereof for excluding debris from pump 12. The ordinarily skilled artisan will understand that filter 22 may exist on either end of uptake line 21 and may also be positioned between the intake line 21 and the pump 12.

Also disposed within the container 11 is the high pressure water delivery hose 28 having a first end connected to an outlet of the pump and a second end connected to a sprayer 26. As is seen from FIG. 2, the output line 28 may be of a polymer ribbon-type hose which may be rolled or folded up into a compact configuration and neatly stored within container 11.

Figure 3:
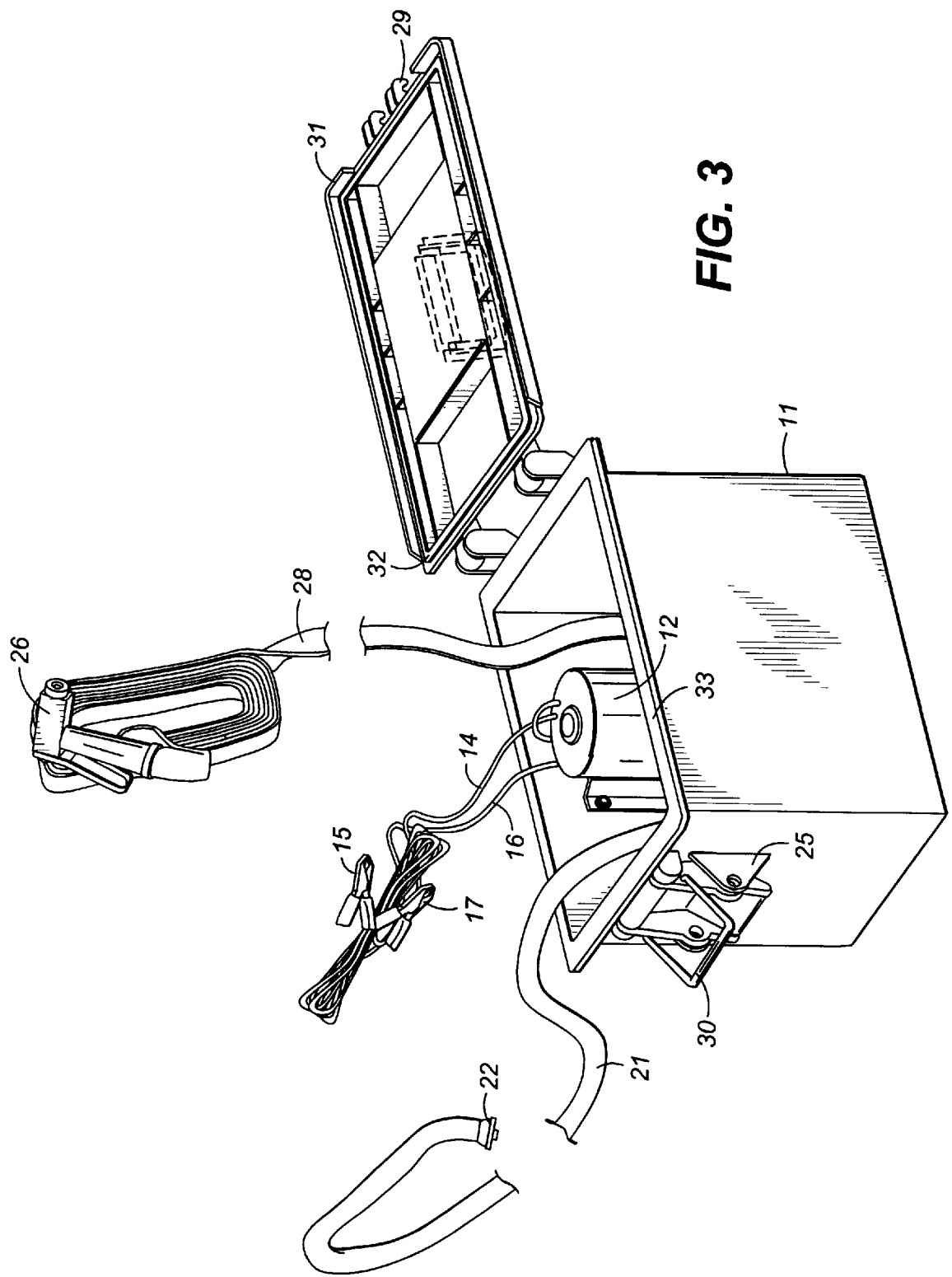
FIG. 3 is an exploded, perspective view of the wash-down system in accordance with the present invention, illustrating each of the components ready for use during an operation mode.

As is seen in FIGS. 2 and 3, the container also includes a latch system for sealingly engaging the lid 31 against a top portion of the container 11. More specifically, the latch system includes a flange 25 which rotatably supports a lock ring 30 which engages a semi-circular depression on a top portion of protrusion 29. After ring 30 engages the semi-circular depression of protrusion 29, latch 27 may be rotated in a counterclockwise fashion and securely provide compression between lid 31 and container 11 via ring 30. When the latch 27 is securely in place, a lock 20 may secure the system in a closed position.

As is best seen in FIG. 3, the up-take hose 21 and filter 22 may be easily removed from the container. Similarly, alligator clips 15 and 17 on electrical connections 14 and 16 may also be easily removed from the container and attached to a battery on the vehicle to be serviced. Finally, the water delivery hose 28 and sprayer 26 may be quickly and easily unfolded and removed from the container 11 to service the vehicle.

Also shown in FIG. 3 is an effective sealing means for hermetically sealing each of the system components of the wash-down system when the system is in a storage mode. More specifically, lid 31 includes a continuous depression which supports a sealing ring 32. Sealing ring 32 may be made of nearly any material, however, a flexible elastomeric gasket material is preferable. Lid 31 is rotated onto cover 11 sealing ring 32 may engage continuous flat surface 33. When latch 25 provides a tight engagement between ring 30 and protrusion 29, a tight and effective seal is created between lid 31 and cover 11 via sealing ring 32 and engagement surface 33.

In operation, the intake line 21 is pulled from the container and the filter 22 is situated within the water source 24, as is denoted by reference numerals 21', 22'. The connectors 14, 16 are attached to a battery 18. Electrical power may also be received through any number of connection types including but not limited to cigarette lighter interfaces and similar devices. Furthermore, the sprayer 26 is pulled to the exterior of the container 11 and utilized to spray water on an object. The sprayer 26 provides a continuous 45 psi spray stream as water from the water source 24 is passed through the filter 22 through line 21, through the pump 12, through line 28, and through the sprayer 26.

Many variations and modifications may be made to the preferred embodiment of the invention as described previously. All such modifications and variations are intended to be included herein within the scope of the present invention.

What is claimed is:

1. A method of washing-down a vehicle comprising the steps of:

providing self-contained unit on the vehicle which houses a pump, a water intake line, a water delivery line and electrical connection leads for providing power to the pump;

attaching the leads to a power source on the vehicle for providing electrical power to the pump;

dropping inlet line into a source of water; and spraying the vehicle with high pressure water expelled through the water delivery line.

2. The method of claim 1, wherein said water intake line includes a filter for preventing large debris from the water source from entering said pump.

3. The method of claim 1 comprising the further step of:

packing the leads, inlet line and water delivery line into the container; and hermetically sealing the container for storage.

4. The method of claim 1, wherein said unit further comprises:

a handle disposed on a top surface of a lid for allowing a user to carry said unit when said unit is in a storage mode.

5. The method of claim 1, wherein said electrical connections are adapted to be stored within said container when said unit is in a storage mode.

6. The method of claim 1, wherein said unit further comprises:

electrical connections being adapted to be removably connected to said power source.

7. The method of claim 6, wherein said power source having a positive pole and a negative pole and being located outside of said container further comprises:

a first and second alligator clip adapted to releasably engage said positive pole and said negative pole of said power source.

8. The method of claim 1, wherein said water intake line comprises a flat foldable hose, said hose being adapted to be stored in a ribbon-like manner in said unit when said unit is in a storage mode.

9. The method of claim 1, wherein said unit further comprises:

a continuous depression formed on a bottom surface of a lid;

a sealing ring adapted to be received within said continuous depression; and a flat, top sealing surface formed on a peripheral upper portion of said unit;

wherein said continuous depression and sealing ring receive said upper portion of said unit when said lid is rotated into a closed position when said unit is in a storage mode, thereby hermetically sealing an inside portion of said unit.

10. The method of claim 1, wherein said unit further comprises:

a substantially vertical protrusion on a second end of a lid, said vertical protrusion including a substantially semi-circular depression on a top portion thereof;

a latch being rotatingly connected to an upper portion of a second end of said unit;

a ring being rotatingly connected said latch, wherein said ring is adapted to engage said semicircular depression when said lid is in a closed position;

wherein said latch is adapted to provide releasable tension between said ring and said lid to seal said lid against said lid when said unit is in a storage mode.

* * * * *